UNITED STATES PATENT OFFICE.

MARTIN VON DUYKE, OF WELLINGTON, OHIO, ASSIGNOR TO SIDNEY R. AUBLE, OF LODI, OHIO.

MEDICATED STOCK-SALT AND PROCESS OF MAKING THE SAME.

No. 879,070.      Specification of Letters Patent.      Patented Feb. 11, 1908.

Application filed August 31, 1905. Serial No. 276,621.

To all whom it may concern:

Be it known that I, MARTIN VON DUYKE, a citizen of the United States, residing at Wellington, in the county of Lorain and State of Ohio, have invented new and useful Improvements in Medicated Stock-Salt and Process of Making the Same, of which the following is a specification.

My invention relates to improvements in stock salts and more particularly to what may be termed a "medicated stock salt and process of making the same," said process of making consisting in so mixing, blending, or incorporating with the grains of salt certain chemical ingredients in a powdered form, after which step, the process is such as to cause the latter to unite or cling to one or more sides of the grains of salt in the form of hardened specks of medication.

My invention has for its object, means for supplying to domestic live stock certain selected medicaments calculated to prevent and to overcome diseases to which domestic cattle are subject, by a general toning of the system, purifying of the blood, etc. It is difficult and inconvenient to administer doses to such stock at required intervals as demanded by the animal's state of health. If incorporated in the food, the dose may be easily miscalculated in the first instance or rendered uncertain from wastage of the food or overeating. Furthermore if powdered drugs are mixed with salt in the ordinary manner great difficulty will be experienced in keeping them uniformly mixed or blended with the salt, or from settling to the bottom of the feed-trough or receptacle in which the mixture is contained, in which latter case, the drugs will be refused by the animal.

It is found that under practically all conditions of health and disease, cattle, using the term in its broad sense, crave, and if permitted, will consume substantially a constant quantity of salt for that particular condition. Given a certain state of health and a free supply of salt, an animal will consume about the same quantity from day to day, and when indisposed nature seems to set up a craving for more salt and other minerals. Taking advantage of this well known fact, I intimately incorporate and associate with granulated kiln-dried salt, certain associated ingredients having medicinal virtues which together cooperate to maintain and restore a balanced state of health, the proportion of salt and medicaments being such that with the natural ration of salt under a stated condition of health, the animal will obtain that dosage best suited to its condition.

My medicated stock salt comprises the following ingredients combined in substantially the proportions stated, viz:

| | |
|---|---|
| Granulated kiln-dried salt | 2,000 lbs. |
| Sulfate of iron (powdered) | 50 " |
| Nitrate of potash " | 20 " |
| Charcoal " | 40 " |
| Sulfur " | 50 " |
| Senna " | 10 " |
| Salts of tartar " | 20 " |

In preparing the above, I proceed as follows: (1st) I mix the sulfate of iron, sulfur and salts of tartar with 100 lbs. of dry salt; (2nd) I mix the nitrate of potash, senna and charcoal; (3rd) mix the results of 1 and 2; (4th) add thereto the remainder of the salt, which has been slightly dampened with water, thoroughly incorporate, pass through a fine sieve and pack for market.

The 100 lbs. of dry salt keeps the ingredients named in 1 and 2, well distributed in a dry state and assists in more uniformly mixing or blending the several ingredients in step 3, and more particularly in uniformly mixing and incorporating with the remaining dampened salt in step 4, of the process.

It is of great importance that each grain of salt shall carry with it a speck of medicament comprising the ingredients above set forth, and for this reason it is important that a very fine grade of granulated kiln-dried salt be used, each grain of such salt being of substantially cubical form, and, in order that each cubical grain of salt may become medicated by the adherence to one or more of its sides of one or more specks of medicament, it is essential that the ingredients be compounded as above set forth.

If the ingredients are merely aggregated and incorporated with the basic salt in a dry state, the grains of salt will not carry the medicament and the results desired will not be brought about. This difference in the chemical composition is plainly visible under the microscope. This medicinal stock salt may well be kept freely within reach of cattle. Their natural craving for salt will cause them to take it as demanded by their systems, and they thus obtain at the same time and, it might be said automatically, a proper amount of medicine calculated to preserve them in a condition of health or to restore health when lacking.

I am aware of the fact that others have incorporated the ingredients of various so-called "condition powders" with ordinary salt but the ingredients being merely aggregated, and the several ingredients being merely in a powdered form, the proper proportions were not preserved through the salt, due to the difference in specific gravity of the various ingredients as well as the tendency of the latter to settle to the bottom of the packages containing the aggregation, while if the several ingredients are mixed with cement or clay, and salt, the water while mixing will unevenly distribute the medicinal ingredients, and the water will come to the top while the compound is drying and hardening carrying with it the medicinal ingredients and leaving the bottom portion of the hardened rock or brick practically worthless as a medicinal agent. Said patented compositions form no part of my invention, and I hereby expressly disclaim the same, but What I do claim and desire to secure by Letters Patent, is,—

1. A medicated stock salt, comprising granulated salt the grains of which carry adhering particles of medicament comprising sulfate of iron, nitrate of potash, charcoal, sulfur, senna and salts of tartar in substantially the proportions specified.

2. The process of making medicated stock salt, consisting in thoroughly incorporating (1) 50 lbs. sulfate of iron, 50 lbs. sulfur, and 20 lbs. salts of tartar with 100 lbs. of dry salt; (2nd) thoroughly mixing 20 lbs. nitrate of potash, 10 lbs. of senna, and 40 lbs. of charcoal; (3rd) thoroughly mixing the results of 1, and 2; (4th) dampen the remaining or 1900 lbs. of salt, thoroughly incorporate all the above, and reduce the salt to a granular condition.

In testimony whereof I have affixed my signature, in presence of two subscribing witnesses.

MARTIN VON DUYKE.

Witnesses.
J. T. HASKELL,
J. WADSWORTH.